United States Patent [19]

Bharadwaj

[11] Patent Number: 5,894,576
[45] Date of Patent: Apr. 13, 1999

US005894576A

[54] METHOD AND APPARATUS FOR INSTRUCTION SCHEDULING TO REDUCE NEGATIVE EFFECTS OF COMPENSATION CODE

[75] Inventor: Jayashankar Bharadwaj, Saratoga, Calif.

[73] Assignee: Intel Corporation, Santa Clara, Calif.

[21] Appl. No.: 08/735,057

[22] Filed: Nov. 12, 1996

[51] Int. Cl.⁶ .................................................. G06F 9/00
[52] U.S. Cl. ......................... 395/709; 395/708; 395/706; 395/392
[58] Field of Search .................... 395/705, 707, 395/709, 800.25, 800.18, 800.23, 377, 384, 390–392, 595, 591, 706, 708, 588

[56] References Cited

U.S. PATENT DOCUMENTS

| | | | |
|---|---|---|---|
| 5,418,959 | 5/1995 | Smith et al. | 395/709 |
| 5,526,499 | 6/1996 | Bernstein et al. | 395/392 |
| 5,530,866 | 6/1996 | Koblenz et al. | 395/708 |
| 5,557,761 | 9/1996 | Chan et al. | 395/709 |
| 5,627,981 | 5/1997 | Adler et al. | 395/582 |

OTHER PUBLICATIONS

David Berstein, Michael Rodeh, "Global Instruction Scheduling for Superscalar Machines," Proceedings of the ACM SIGPLAN '91 Conference on Programming Language Design and Implementation, Toronto, Ontario, Canada, Jun. 26–28, 1991.

David Bernstein, Doron Cohen, Hugo Krawczyk, IBM Israel Scientific Center, Haifa, Isreal, entitled: "Code Duplication: An Assist for Global Instruction Scheduling," (1991).

Alfred V. Aho, Ravi Sethi, Jeffrey D. Ullman, Compliers, Principles, Techniques, and Tools, Chapters 1, 8, and 9, Addison–Wesley Publishing Co. (1986).

Choi et al., "Scheduling of Conditional Branches Using SSA form for Superscalor/VLIW processors," Parallel and Distributed Systems, 1996 Int'l. Conference, Jun. 1996.

Golumbic et al., "Instruction Scheduling Across Control Flow," Scientific Programming vol. 2, No. 3, pp. 1–5, Fall 1993.

Watts et al., "Techniques for Integrating Parallelizing Tranformations and Compiler Based Scheduling Methods," Superconducting '92, 1992.

*Primary Examiner*—Tariq R. Hafiz
*Assistant Examiner*—Tuan Q. Dam
*Attorney, Agent, or Firm*—Arnold, White & Durkee

[57] ABSTRACT

A method is described for scheduling an instruction of a computer program. The instruction is scheduled into an active block of the computer program if no compensation copy is necessary, or if any necessary compensation copy is acceptable.

15 Claims, 14 Drawing Sheets

METHOD AND APPARATUS FOR INSTRUCTION SCHEDULING TO REDUCE NEGATIVE EFFECTS OF COMPENSATION CODE

BACKGROUND OF THE INVENTION

1. Field of the Invention

The present invention relates generally to the field of computer systems, and more particularly to a method of instruction scheduling in superscalar or very large instruction word (VLIW) processors that reduces the harmful effects of compensation code.

2. Description of the Related Art

In a typical computer system, the central processing unit ("CPU") executes a compiler program whose job is to translate a computer program from one language into another. Typically the program to be compiled, called the source code program, is written in one of the traditional programming languages such as Pascal, FORTRAN, or C, although it may take other forms. The language into which the source code program is to be translated, called the target language, could be another programming language, object code, or code readable by a machine, for example. In any event, the compiler translates the source code program into the target language of choice.

The final step in the compiler's translation of the source code program is code generation, during which the compiler creates the final representation of the source code program in the target language. One step that is performed during the code generation process is called instruction scheduling. During instruction scheduling, individual instructions of the target code (or instructions of an intermediate representation of the target code) are rescheduled so that more instructions execute in each clock cycle, enabling faster execution of the target code instructions and more efficient use of machine resources.

Conceptually, instruction scheduling involves movement of instructions within a control flow graph representation of the program to be executed. A control flow graph is an interconnected set of basic blocks, where each basic block is simply a collection of the program's instructions. More specifically, a basic block is a series of instructions that always execute consecutively, with no possibility of halting or conditional branching under normal execution (basic blocks may or may not include procedure calls and unconditional branches, depending on how a basic block is defined by the compiler). Program control always enters a basic block from the top, i.e., the first instruction in the basic block is always the first to be executed. Therefore, once program control flows to the first instruction in a basic block, all instructions in the basic block will execute consecutively, at which point control will flow to another basic block. Because every instruction in the program is included in a basic block, the program may be entirely represented as a collection of basic blocks, interconnected by edges to reflect how program control can flow from block to block. This interconnected collection of basic blocks is the control flow diagram. Older instruction scheduling methods reorganized instructions within basic blocks to produce more efficient target code, but did not move instructions between basic blocks. In more recently developed scheduling methods, instructions are moved between blocks within a region to further increase the efficient use of machine resources. In all of these methods, instructions are scheduled into only one block at a time.

Movement of instructions between blocks creates the problem that a moved instruction might never be executed in instances when it should have been executed. For instance, referring to the sample control flow graph of FIG. 1, suppose there is a basic block B, and that program control may flow to block B from one of two predecessor blocks, P1 and P2 (in this context, a predecessor/successor block is a block immediately preceding/succeeding the block in question in the control flow diagram). Suppose further that an instruction from block B is moved upward into block P1 by the instruction scheduler. If program control flowed to block B from block P2, the instruction would never be executed. In this situation, the use of compensation code is necessary. The instruction scheduler creates compensation copies of moved instructions to guarantee that all instructions are executed as they should be, regardless of how program control proceeds. In this example, if an instruction were moved from block B to block P1 by the instruction scheduler, a compensation copy of the instruction would be placed into P2, so that the instruction will be executed no matter which path the program control takes. Compensation code is necessary any time an instruction is moved (scheduled) into a new basic block in the control flow graph, but as a result of its new location, the instruction might never be executed when it should be. The need for compensation code can also be encountered in cases of downward code motion, when an instruction is moved below a block in the control flow diagram with multiple successors.

The creation of compensation code can reduce the efficiency of target code, by increasing the number of clock cycles necessary to execute a particular block of code. Under current scheduling methods, the instructions are scheduled without heed to the effect of compensation code on the block into which it is inserted. The creation of compensation copies can therefore work against the compiler's otherwise meticulous attention to the efficient scheduling of instructions into blocks. As a result, the overall efficiency of the target code can be lowered.

The present invention is directed to overcoming, or at least reducing the effects of, the problem set forth above.

SUMMARY OF THE INVENTION

The invention relates to a method of scheduling an instruction of a computer program. The instruction is scheduled into an active block of the computer program if no compensation copy is necessary, or if any necessary compensation copy is acceptable.

BRIEF DESCRIPTION OF THE DRAWINGS

The foregoing and other advantages of the invention will become apparent upon reading the following detailed description and upon reference to the drawings in which.

Figure 1:
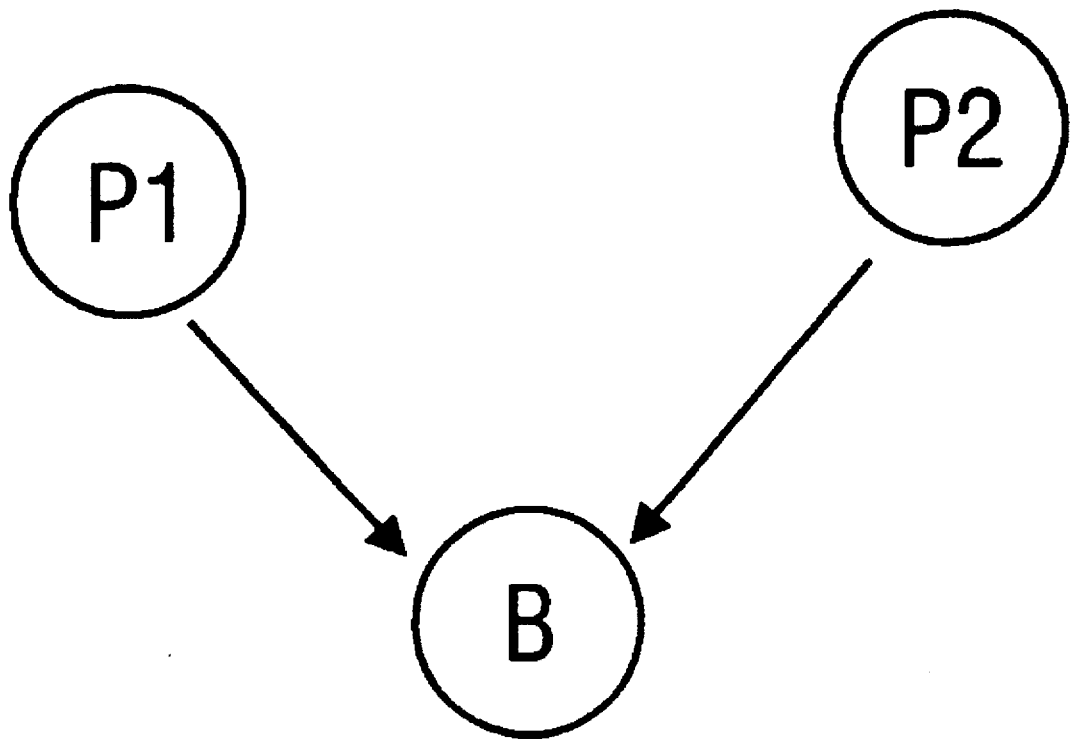
FIG. 1 illustrates a sample control flow graph.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DESCRIPTION OF ILLUSTRATIVE EMBODIMENTS

Figure 2:
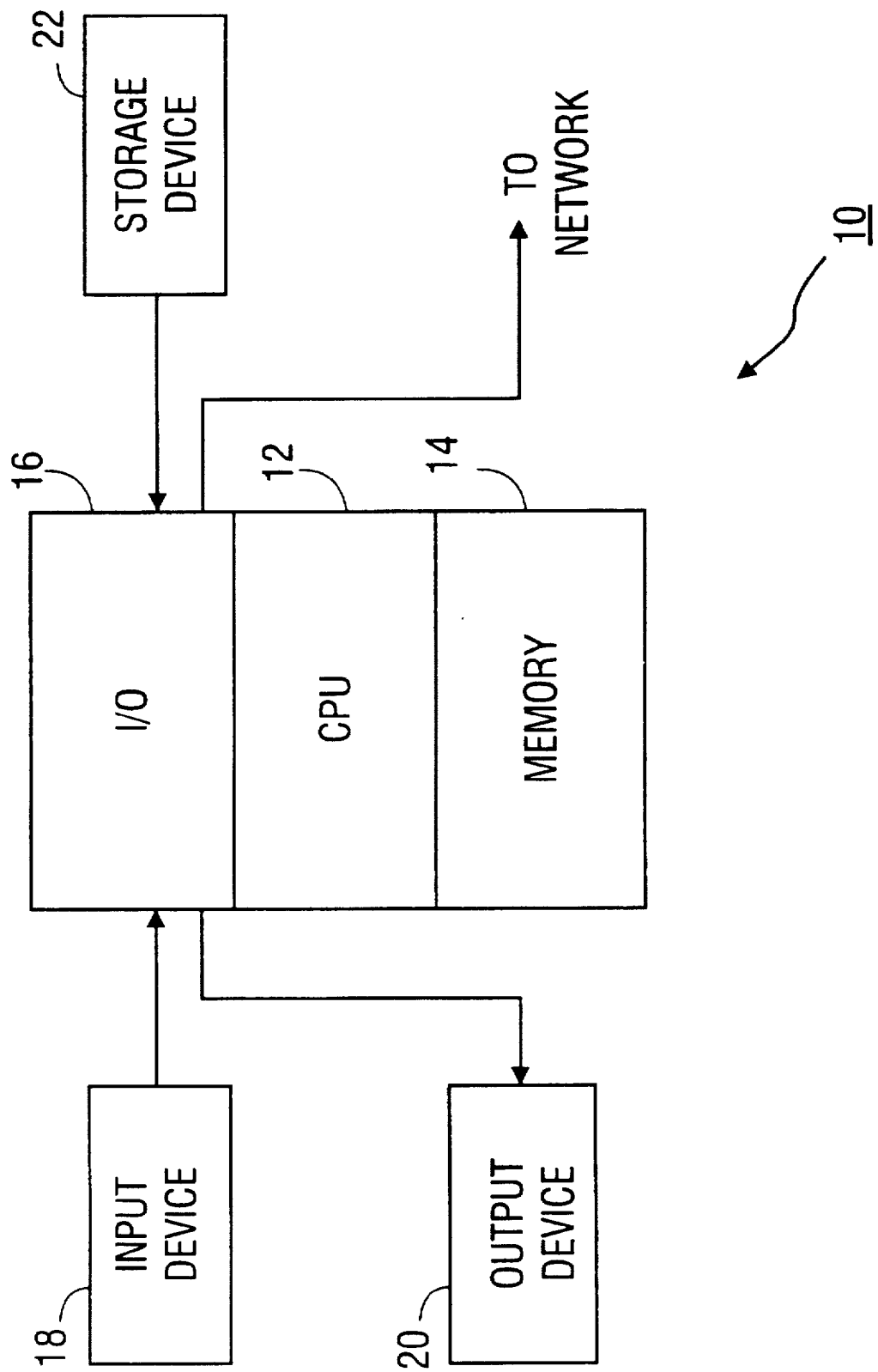
FIG. 2 illustrates an exemplary computer system incorporated with the teachings described herein.

Turning now to the drawings and referring initially to FIG. 2, a block diagram illustrating an exemplary computer system incorporated with the teachings described herein is shown. The exemplary computer system 10 comprises a central processing unit (CPU) 12, a memory 14, and an I/O module 16. Additionally, the exemplary computer system 10 also comprises a number of input/output devices 18 and 20, and a number of storage devices 22. The CPU 12 is coupled to the memory 14 and the I/O module 16. The input/output devices, 18 and 20, and the storage devices 22 are also coupled to the I/O module 16. The I/O module 16 in turn is coupled to a network. Except for the manner they are used to practice the method described herein, the CPU 12, the memory 14, the I/O module 16, the input/output devices, 18 and 20, the storage devices 22, and the network are intended to represent a broad category of these hardware elements found in most computer systems. The constitutions and basic functions of these elements are well known and will not be otherwise further described here.

Figure 3:
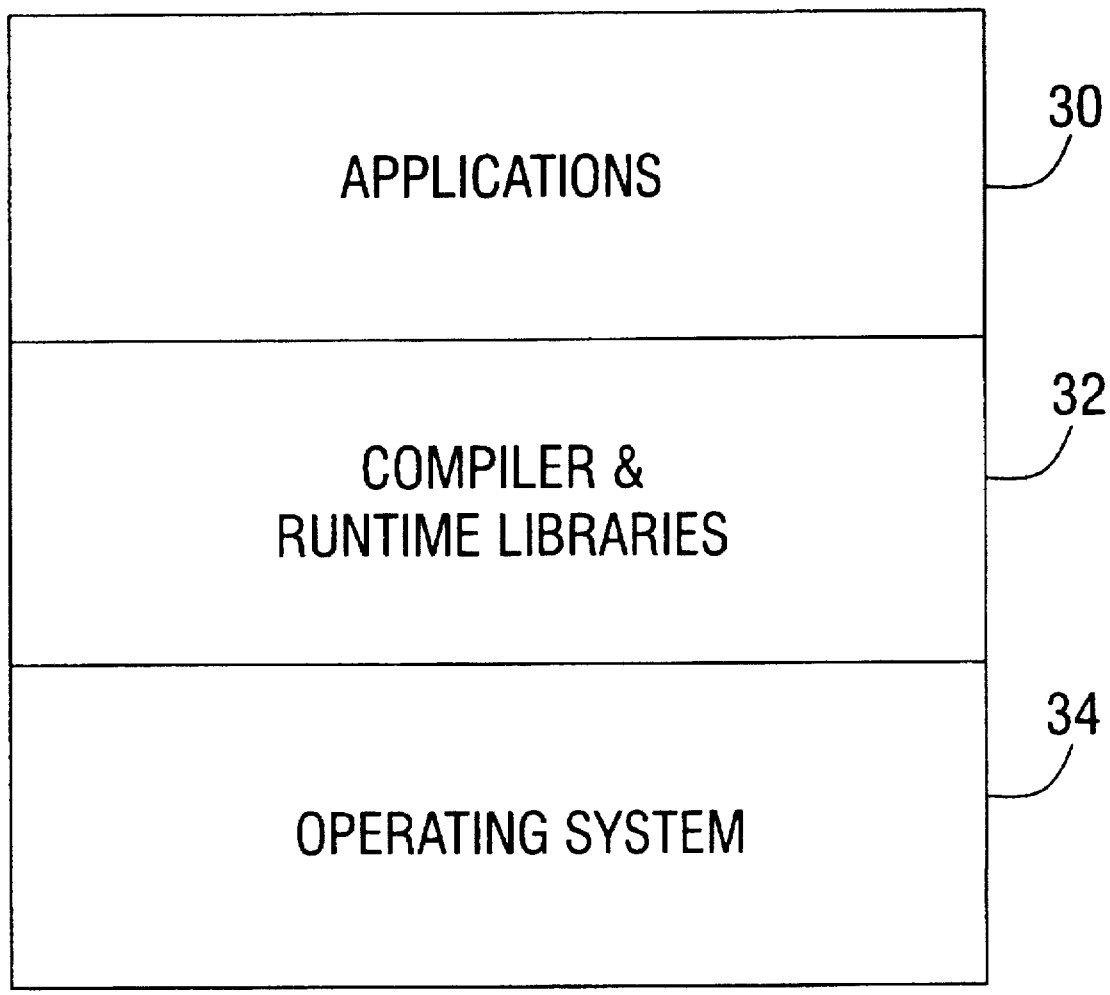
FIG. 3 illustrates the software elements of the exemplary computer system of FIG. 2.

FIG. 3 illustrates the software elements of the exemplary computer system in FIG. 2. Shown are application programs 30 compiled using the compiler 32. The compiled application programs 30 access the runtime libraries 32 for services during execution, which in turn access the operating system 34 for system services. The compiler 32 also accesses the operating system 34 for system services during compilation of application programs 30. Similar to the hardware elements, except for the teachings described herein incorporated in the compiler 32, these software elements are intended to represent a broad category of similar software elements found in most computer systems. The constitutions and basic functions of these elements are well known and will not be otherwise further described here.

Figure 4:
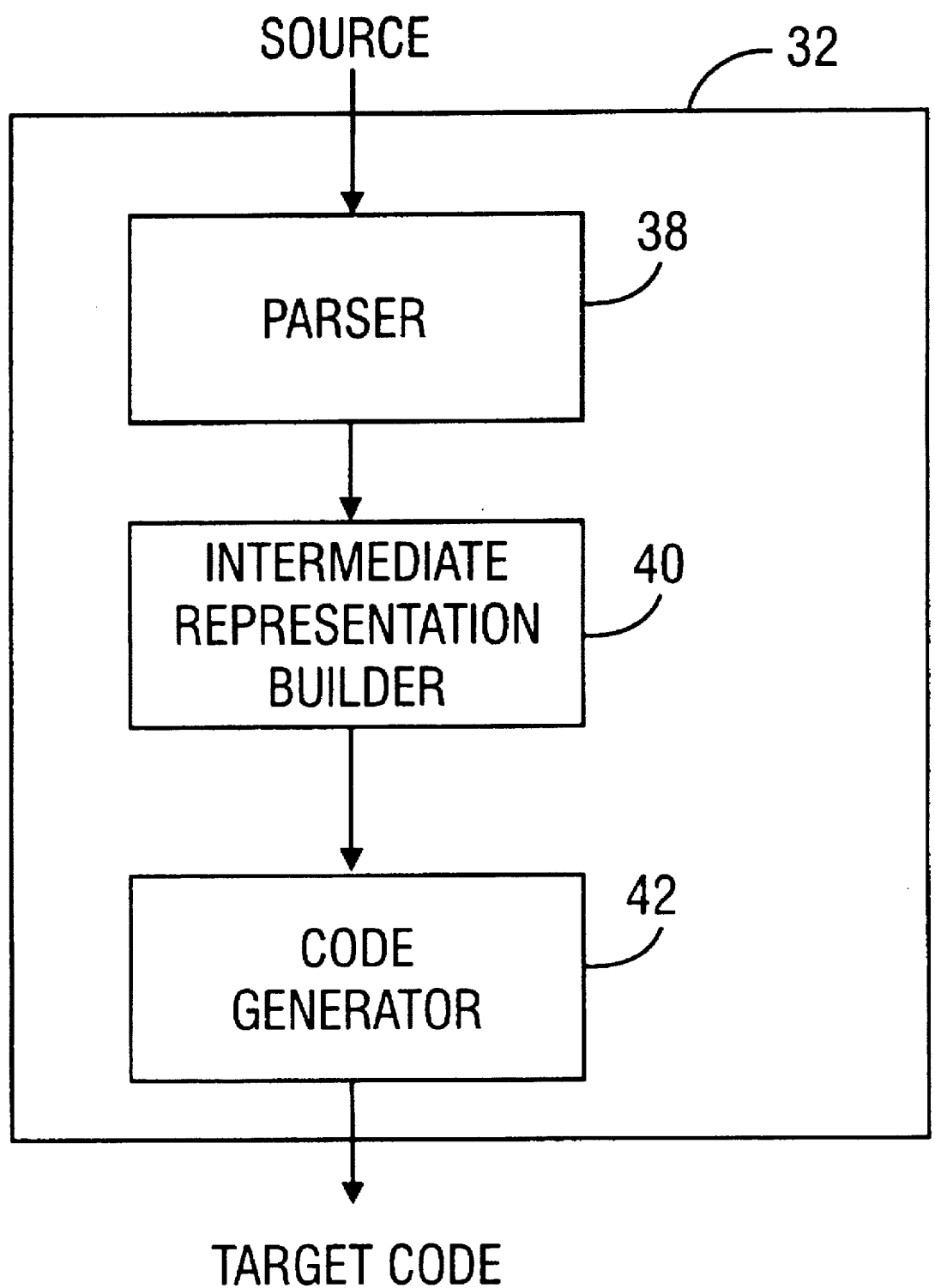
FIG. 4 illustrates one embodiment of the exemplary compiler of FIG. 3.

Referring now to FIG. 4, a block diagram illustrating one embodiment of the compiler of FIG. 3 is shown. In this embodiment, the compiler 32 comprises a parser 38, an intermediate representation builder 40, and a code generator 42. The parser 38 receives the source code of a program to be compiled as inputs. In response, it parses the source language statements and outputs tokenized statements. The intermediate representation builder 40 receives the tokenized statements as inputs. In response, it constructs intermediate representations of the tokenized statements. The intermediate representation builder 40 also groups these intermediate representations into basic blocks and determines how the blocks are interconnected in a control flow diagram, although these steps may be performed at the beginning of code generation. It may also perform high-level optimizations on the intermediate representations. The code generator 42 receives the intermediate representations as inputs. In response, it generates target code for the program. Except for the teachings described herein incorporated in the code generator 42, these components are intended to represent a broad category of similar components found in most compilers. The constitutions and basic functions of these components are well known and will not be otherwise further described here.

Figure 5:
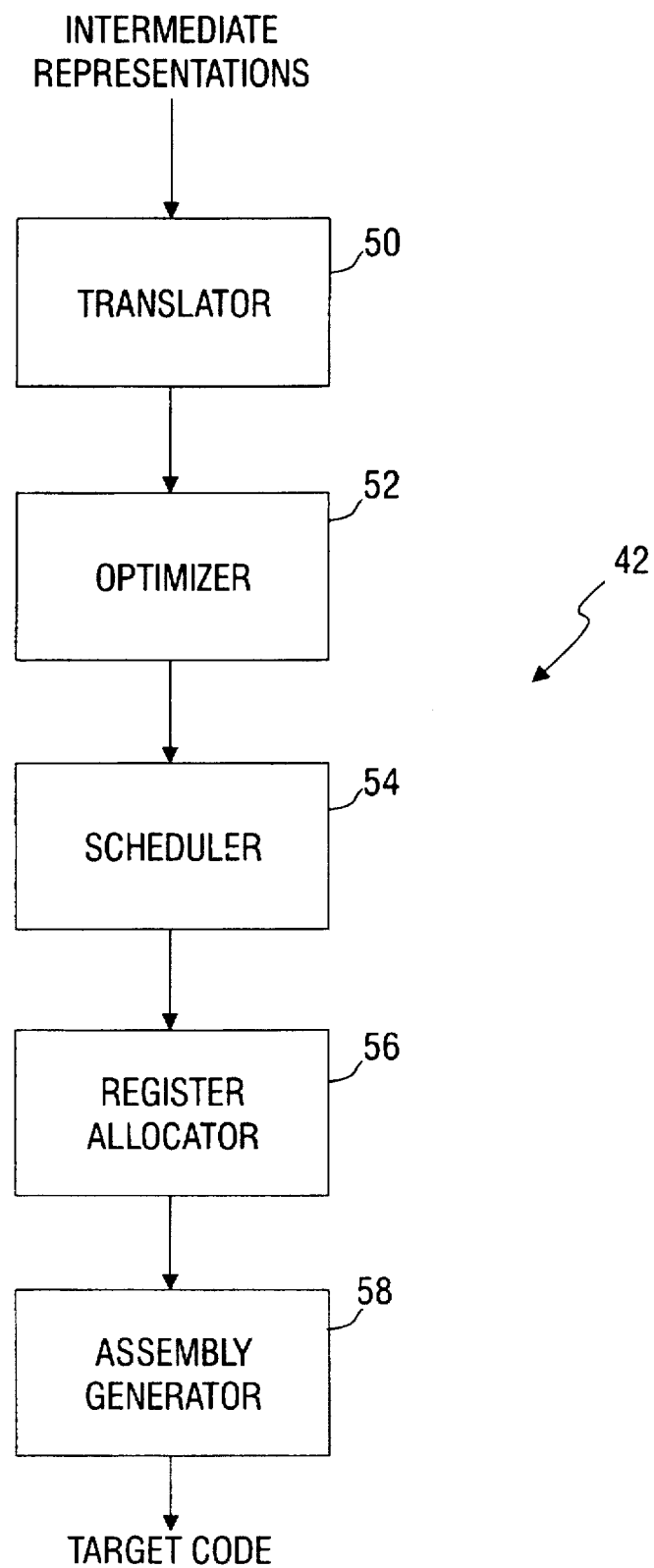
FIG. 5 illustrates one embodiment of the exemplary code generator of FIG. 4.

Referring now to FIG. 5, a block diagram illustrating one embodiment of the code generator of FIG. 4 is shown. In this embodiment, the code generator 42 comprises a translator 50, an optimizer 52, a scheduler 54, a register allocator 56, and an assembly generator 58. The translator 50 receives as inputs the intermediate representations of the program to be compiled and translates them into a sequence of low-level intermediate representations, which are representations of the source program that correspond very closely to machine instructions. The optimizer 52 receives these low-level intermediate representations as inputs and performs optimizations on them, attempting to produce faster running, more efficient instructions. The scheduler 54 receives the optimized representations as inputs and reorders them so that they will be executed in a manner that uses the resources of the computer system 10 more efficiently, thereby reducing the number of clock cycles necessary to run the program.

The register allocator 56 receives the reordered representations as inputs, and it determines from their order which variables will reside in which registers at any given point in the program. The register allocator 56 may also generate spill code, which are additional load and store instructions that allow the compiler to place the contents of a register into main memory while the register is used to hold other information. Because the register allocator 56 generates spill code after scheduler 54 has already scheduled the other instructions in the region, the spill code instructions may not be well scheduled. Thus, in other embodiments, register allocation may occur before scheduling, control may return to scheduler 54 after register allocation, or scheduling and register allocation may occur simultaneously. Lastly, the assembly generator 58 then receives the optimized, scheduled, and register allocated low-level intermediate representations as inputs and produces the target code for the program being compiled. Except for the teachings described herein incorporated in the scheduler 54, the elements of the code generator 42 are intended to represent a broad category of similar elements found in most code generators. The constitutions and basic functions of these elements are well known and will not be otherwise further described here.

Figure 6:
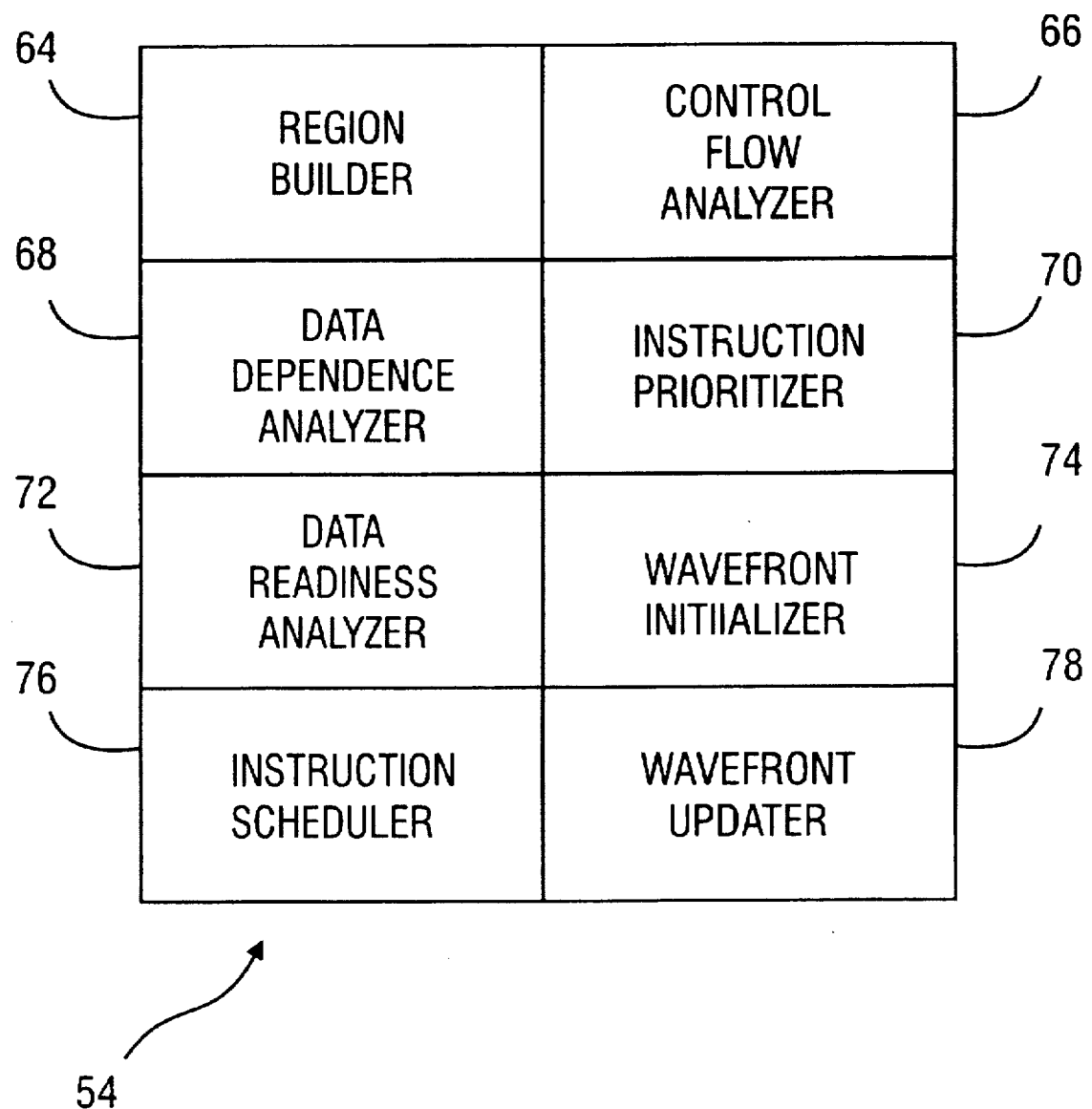
FIG. 6 illustrates one embodiment of the exemplary scheduler of FIG. 5.

Referring next to FIG. 6, a block diagram illustrating one embodiment of the scheduler of FIG. 5 is shown. In this embodiment, the scheduler 54 comprises a region builder 64, a control flow analyzer 66, a data dependence analyzer 68, an instruction prioritizer 70, a data readiness analyzer 72, a wavefront initializer 74, an instruction scheduler 76, and a wavefront updater 78. At the beginning of the scheduling process, the region builder 64 partitions the program to be compiled into regions. A region is the portion of the control flow diagram over which scheduling is performed. A region can have any number of entry and exit points, i.e., edges in the control flow diagram entering or exiting the region. Control flow within a region must be acyclic; hence, the region cannot directly contain loops. The region may, however, contain special blocks that represent nested loops or nested regions, with loop nesting represented through a hierarchy in the regions. Regions formed for acyclic control flow may also be organized in a hierarchical structure to force an order in the scheduling (inner before outer), to allow scheduling across inner regions, and to enable formation of regions without side entries.

After regions are formed, the control flow analyzer 66 next operates on the program being compiled. Before doing so, however, in one embodiment all "JS edges" in the region must be removed by the insertion of compensation blocks. A JS edge is an edge in the control flow graph that flows from a split block to a join block. A split block is a block with multiple successors in the control flow graph, and a join block is a block with multiple predecessors in the control flow graph. In this embodiment, any edge from a split block to a join block must be removed, and this is achieved by the insertion of an empty compensation block along such an edge. Thus control will flow from the split block to the empty compensation block to the join block.

Figure 13A:
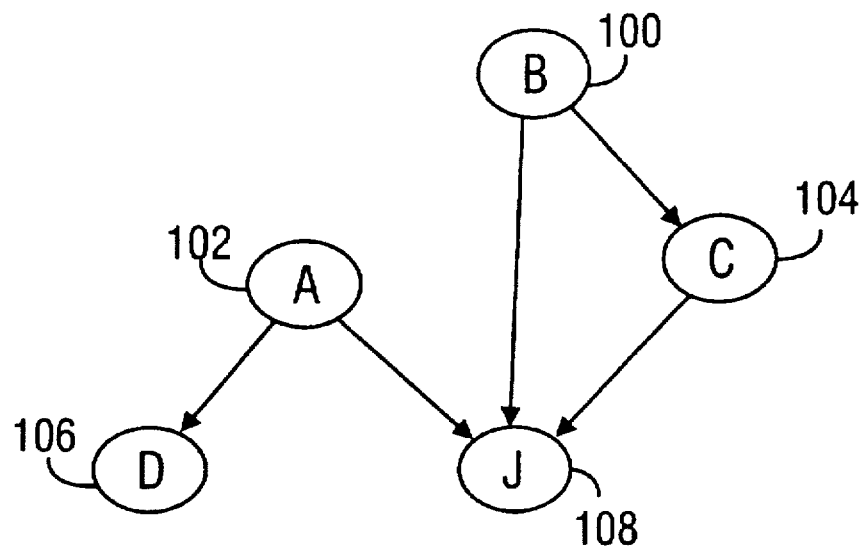
FIG. 13A–13B illustrates a control flow graph representation of a source program to be compiled.
Figure 13B:
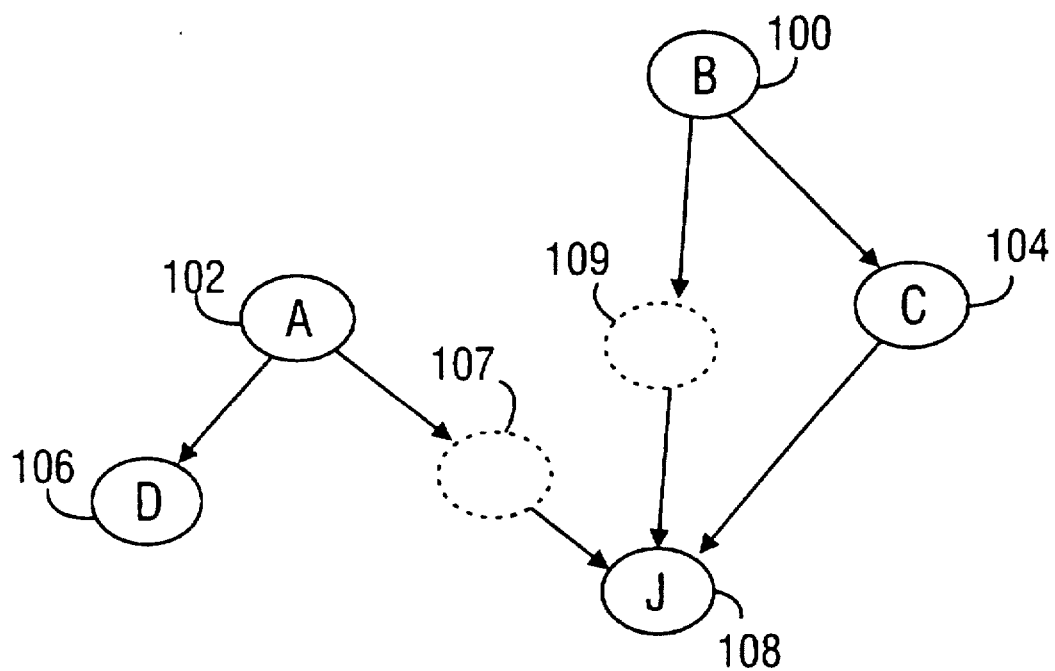

The need to remove JS edges in the control flow graph is illustrated in FIG. 13. FIG. 13A represents a control flow graph with instruction blocks B 100, A 102, C 104, D 106, and J 108. Block J 108 is a join block (it has more than one predecessor), and blocks A 102 and B 100 are split blocks (they each have more than one successor). Thus, the edge between block A 102 and block J 108 is a JS edge, and the edge between block B 100 and block J 108 is also a JS edge. Suppose an instruction from block J 108 were scheduled into block C 104. Then, if program control flowed directly from block B 100 to block J 108, the instruction would never be executed. To prevent this result, a compensation copy of the instruction needs to be placed into block B 100. In that situation, however, if program control flowed from block B 100 to block C 104, the same instruction would be executed twice. Thus, JS edges create the problem that multiple copies of the same instruction may appear along a single control flow path. To prevent this redundancy while preserving the ability to schedule instructions where they will be most efficiently executed, empty compensation blocks 107 and 109 are inserted along all JS edges, as illustrated in FIG. 13B. In the above example, if an instruction from block J 108 were scheduled into block C 104, a compensation copy of the instruction could be inserted into compensation block 109. In that case, there would be only a single copy of the instruction along any given control flow path, a property called "single copy on a path" (SCP).

Some empty compensation blocks are not necessary to maintain the SCP property. Furthermore, a majority of the compensation blocks will remain empty after scheduling is done and hence will be deleted. It is therefore useful to know which blocks are likely to remain empty to improve the choice of block ordering. A compensation block that ought to be left empty is marked as a dummy block. Some heuristics will be used to decide which compensation blocks are very likely to remain empty during the scheduling process.

Many nonexclusive methods exist for determining which compensation blocks should be marked as dummy blocks. In one method, compensation blocks not necessary to preserve the SCP property are marked as dummy blocks. For example, referring again to FIG. 13B, it was determined above that compensation block 109 is necessary to preserve the SCP property. However, the SCP property is maintained even without compensation block 107. This is because block A 102 does not reach another predecessor to block J 108, as block B 100 does. Thus, compensation block 107 and others like it in the control flow graph can be designated as dummy blocks. Another method for determining which compensation blocks will be designated as dummy blocks examines the parallelism of instructions in the other blocks. In FIG. 13B, for instance, if instructions were organized in block C 104 so as to fully use the machine resources at each clock cycle, nothing else could be scheduled into that block, and therefore compensation block 109 would not be very important and could be marked dummy. However, if instructions in block C 104 were such that only a portion of the machine resources were being utilized in a given clock cycle, it would be desirable to schedule other instructions into that block to fully use the machine resources. In that instance, compensation block 109 would be necessary to accept compensation copies of instructions that are scheduled into block C 104. Under another method, a compensation block would be marked dummy if it sat along a very high probability control flow path.

In another embodiment, compensation blocks might not be inserted. Such an embodiment would be the functional equivalent of inserting the compensation blocks, as in this embodiment, and designating them all as dummy blocks.

Returning to FIG. 6, within each region, the control flow analyzer 66 calculates various control flow data. (In computing all such data, edges not in the region are ignored.) For example, it computes reachability, i.e., for each block in the control flow diagram, it determines which blocks are reachable from it. Further, it determines which blocks make up the set SISS(active, original) for all the possible combinations of active and original blocks. SISS stands for "strongly independent separating set," and SISS(active, original) is the set of blocks consisting of the bottom-most blocks in the control flow diagram at which compensation copies of an instruction may be scheduled, while maintaining the SCP property, when moving the instruction from its original block into the active block (the active block being the block into which instructions are currently being scheduled). In addition, for each set of two blocks A and B, the control flow analyzer 66 computes speculativeness, i.e., the probability of control passing through block B given that it has passed through block A. It also computes information on dominance, post-dominance, and control equivalence. Block A is said to dominate block B if every path to block B first passes through block A. Block B is said to post-dominate block A if every path from block A eventually passes through block B. If block A dominates block B, and block B post-dominates block A, then they are said to be control equivalent. The control flow analyzer computes all this information and stores it in main memory.

Using the control flow data, the data dependence analyzer 68 generates a directed acyclic graph (dag) representation of the instructions in the region. The dag gives a hierarchy of data dependence between the instructions, showing how the instructions depend on the outcome of previous instructions. The data dependence analyzer 68 stores the information on data dependence in main memory.

Using the information in the dag, the instruction prioritizer 70 assigns a priority to the individual instructions, computed based on a number of factors. For example, the height of an instruction will affect its priority. An instruction's height is the minimum number of cycles it will take to execute that instruction and the chain of instructions it feeds in the dag. An instruction that has numerous successors will tend to have greater priority than one that has few. An instruction in a high probability block will tend to have a greater priority than one in a low probability block. Instruction priority can also be adjusted during scheduling. For example, an instruction that will require compensation code if it is moved into the active block will tend to have a lower priority than one that will not. Also, code motion that may produce spill code will tend to have lower priority than code motion that will not. Based on a plurality of factors, priorities are assigned to the instructions. The instruction prioritizer 70 stores information on instruction priority to main memory.

Using the information on control flow and data dependence, the data readiness analyzer 72 will create and update the data ready list for each block on the wavefront during scheduling. A block's data ready list are the instructions that can be but have not yet been scheduled into the block, and for which the necessary predecessor instructions in the dag have been scheduled. An instruction may be at one of many states of "readiness," and an instruction at any of these states of readiness may appear on the data ready list for the block. For example, an instruction is fully ready in a block if all its predecessor instructions in the dag have been scheduled. An instruction may also be considered ready in a block if all the predecessor instructions in the dag lying on any control flow path between the block and the instruction have been scheduled. Furthermore, an instruction may be considered ready in a block if there is any control flow path at all between the block and the instruction along which there is no unscheduled operand of the instruction. The algorithm for determining whether an instruction is data ready in a block will vary depending on the embodiment.

The data ready list for each block is divided into clock cycles, i.e., the instructions become data ready only at a certain clock cycle, which depends on their instruction latencies and when their predecessor instructions have been scheduled. For a given clock cycle, the data ready list is sorted by instruction priority, i.e., higher priority instructions precede lower priority instructions. The data readiness analyzer 72 initializes the data ready lists for blocks on the wavefront (defined below) when the wavefront is initialized, it computes the data ready list for any block that is added to the wavefront, and it updates the data ready lists whenever an instruction is scheduled.

Using the control flow data, the wavefront initializer 74 can choose the initial set of blocks that will form the wavefront. The wavefront is a device used during scheduling, as explained below, to verify that any necessary compensation copies of moved instructions are acceptable to the blocks into which they are moved. In this embodiment, the wavefront is selected such that any control flow path from an entry point of the region to an exit point of the region passes through exactly one wavefront block. This property may be summarized by labeling the wavefront a strongly independent cut set (SICS). Initially, the wavefront is defined as the set of all blocks in the region that do not have predecessors in the region, a set which satisfies the above property. As long as modifications to the wavefront follow certain rules discussed below, the wavefront is guaranteed to remain a SICS. Information on which blocks are in the wavefront is stored to main memory. The wavefront initializer 74 also chooses a block on the wavefront to be the active block, which is the block on the wavefront into which instructions are currently being scheduled.

Once the wavefront is chosen, the instruction scheduler 76 may begin scheduling instructions. Instructions are always scheduled into the active block. The instruction scheduler 76 determines which instruction should be scheduled next by looking at the data ready list for the active block. If no suitable candidate instruction is available, the instruction scheduler 76 chooses a new active block and again attempts to find an instruction. Once a suitable candidate instruction is found (meaning there is an instruction available in the current clock on the active block's data ready list, there are adequate machine resources to schedule the instruction, and any necessary compensation code is deemed acceptable), the instruction will be scheduled. Scheduling in the active block proceeds until no suitable instruction is found or the block is closed. The operational flow of the instruction scheduler is described below in connection with FIGS. 7, 9, and 10.

Figure 11:
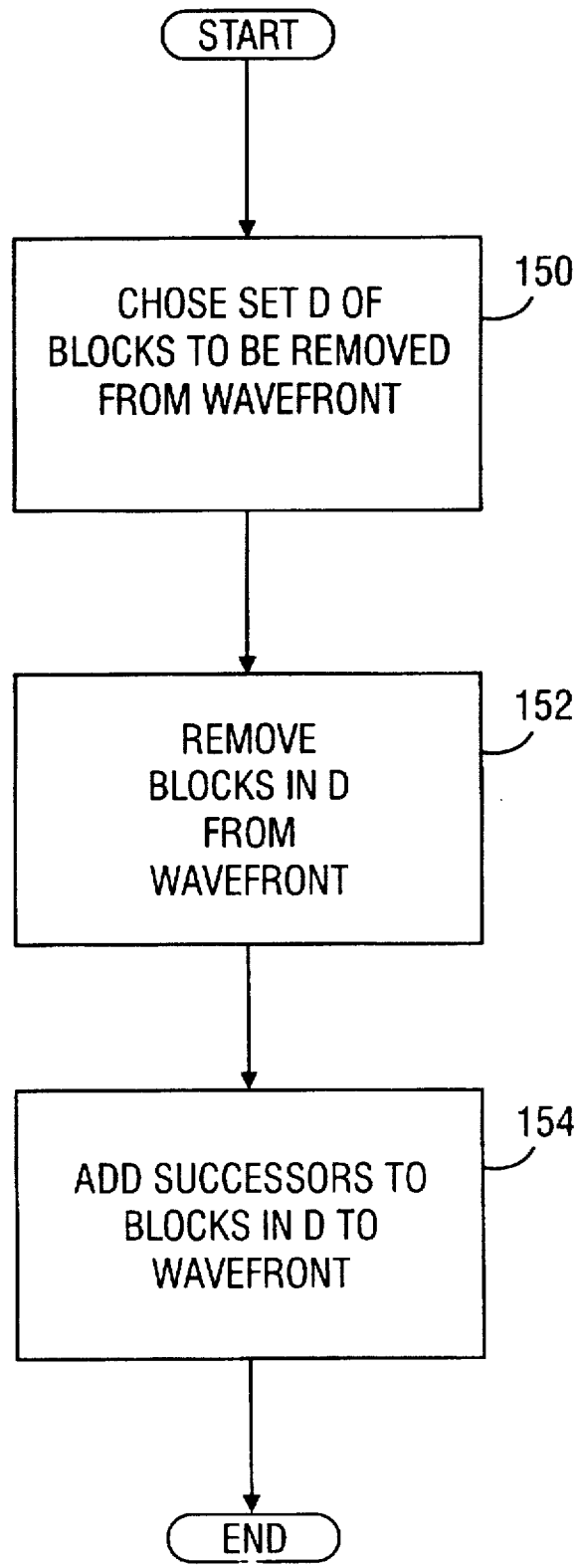
FIG. 11 shows a block diagram illustrating the operational flow of the wavefront updating procedure of the exemplary scheduler of FIG. 5.
Figure 12:
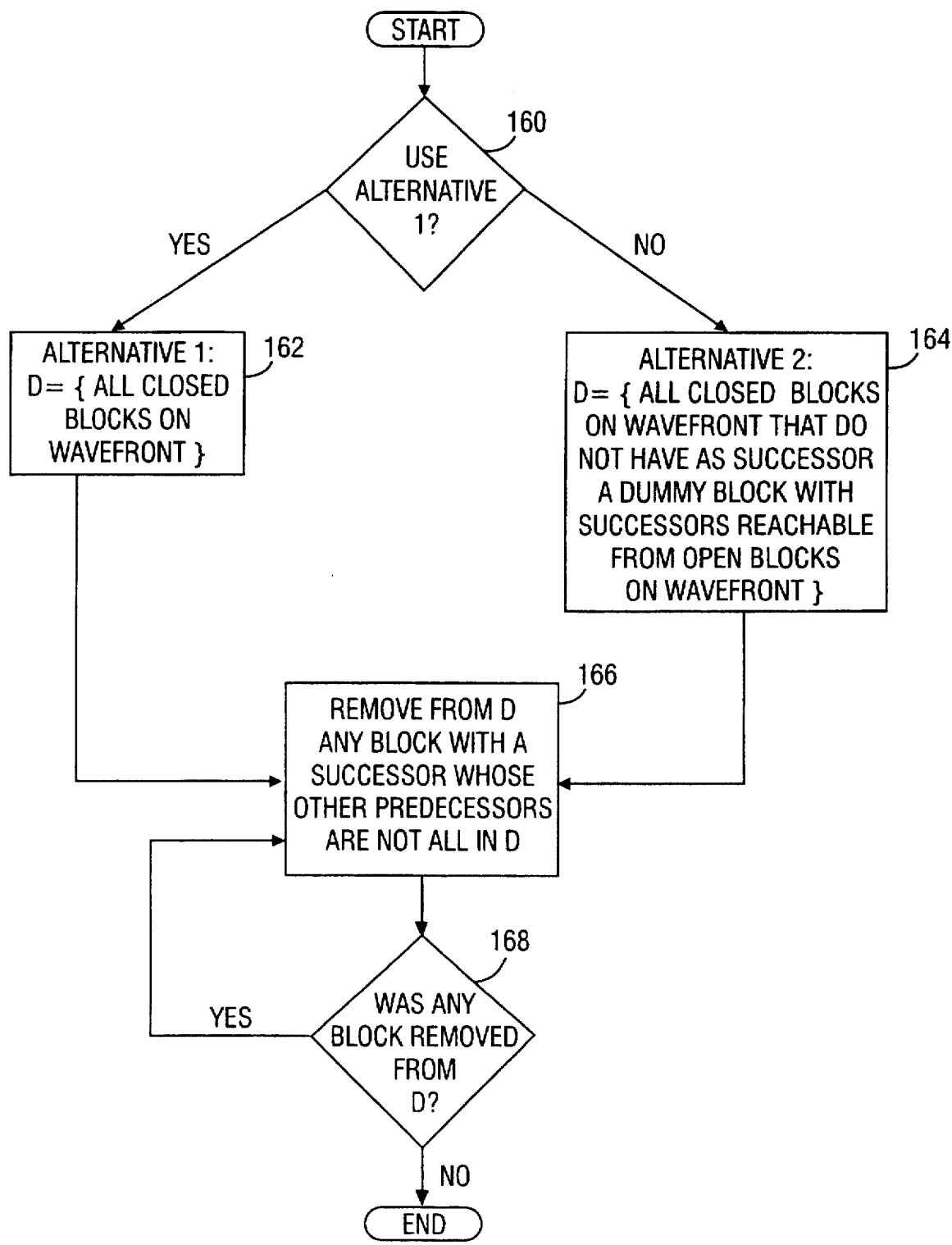
FIG. 12 shows a block diagram illustrating the operational flow of the procedure for choosing blocks to be removed from the wavefront in the exemplary scheduler of FIG. 5.

Whenever the active block becomes closed (the closing of blocks is discussed below), the wavefront updater 78 attempts to update the wavefront. The wavefront updater 78 uses information generated by other parts of the scheduler to determine which blocks should be removed from the wavefront and which should be added to the wavefront. The operational flow of the wavefront updater is illustrated in FIGS. 11 and 12 and will be described below.

Figure 7:
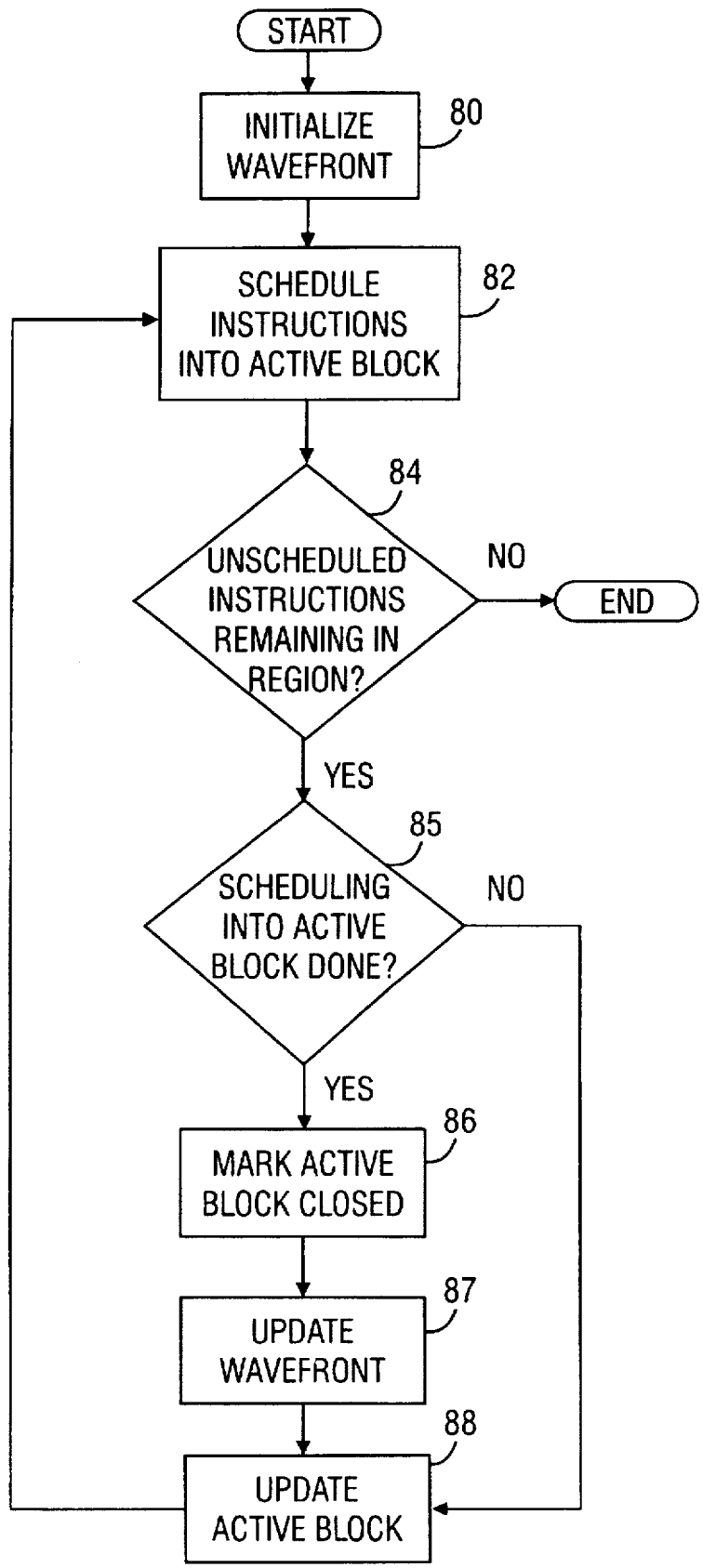
FIG. 7 shows a block diagram illustrating the operational flow of the exemplary scheduler of FIG. 5.

Referring now to FIG. 7, a block diagram illustrating the operation of one embodiment of the scheduler of FIG. 5 is shown. After the program to be compiled has been partitioned into regions, the scheduler designates a subset of the blocks in the region as the wavefront, i.e., initializes the wavefront, step 80.

Figure 8:
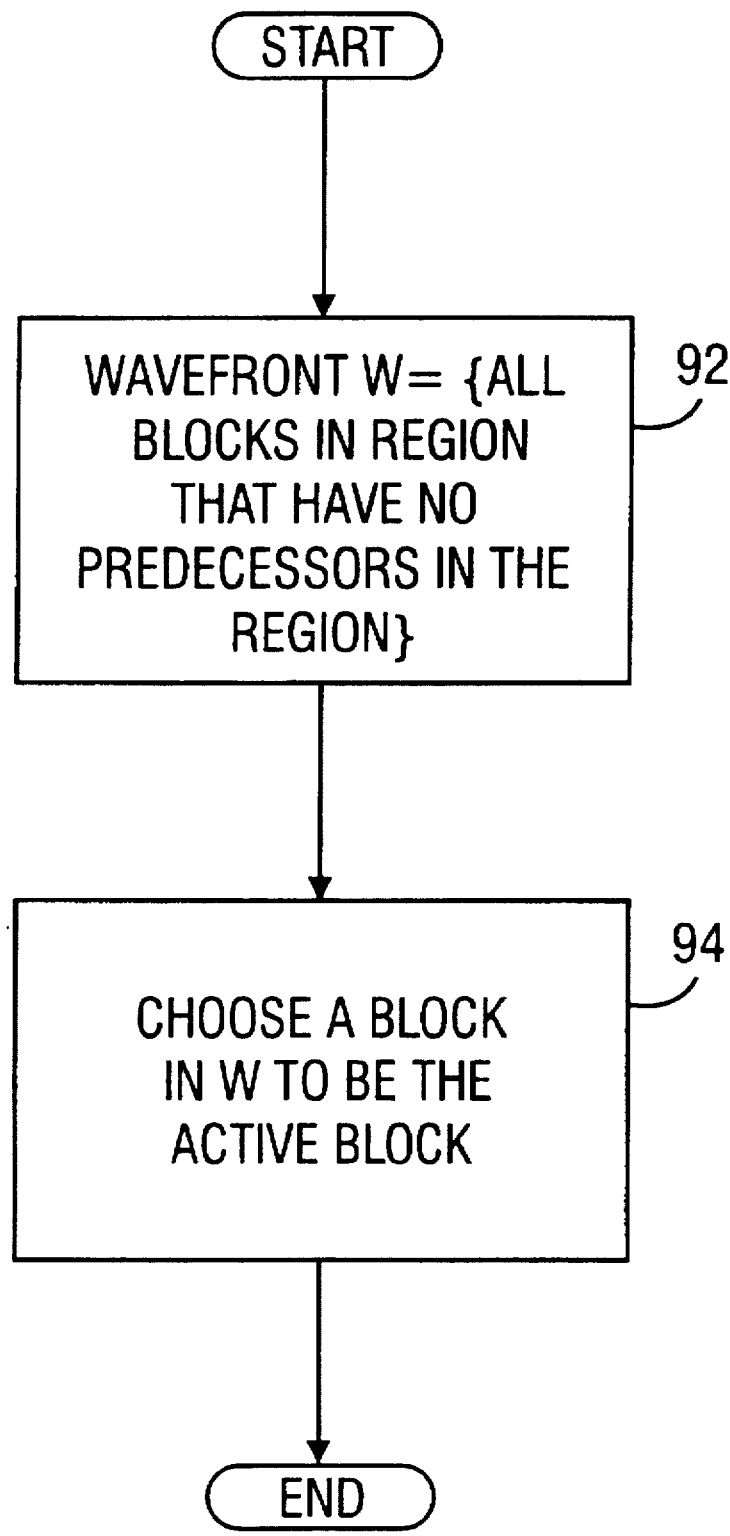
FIG. 8 shows a block diagram illustrating the operational flow of the wavefront initialization procedure in the exemplary scheduler of FIG. 5.

FIG. 8 illustrates the steps involved in initializing the wavefront. At step 92, the set of blocks to be designated as the wavefront is selected. As described above, in this embodiment the wavefront must be a SICS, and initially the wavefront is defined as the set of all blocks in the region that do not have predecessors in the region. Before scheduling may begin, a block in the wavefront must be designated as the active block, step 94. The active block is the block into which instructions will be scheduled. The block that is designated as active will change, but the active block will always be in the wavefront.

Figure 9:
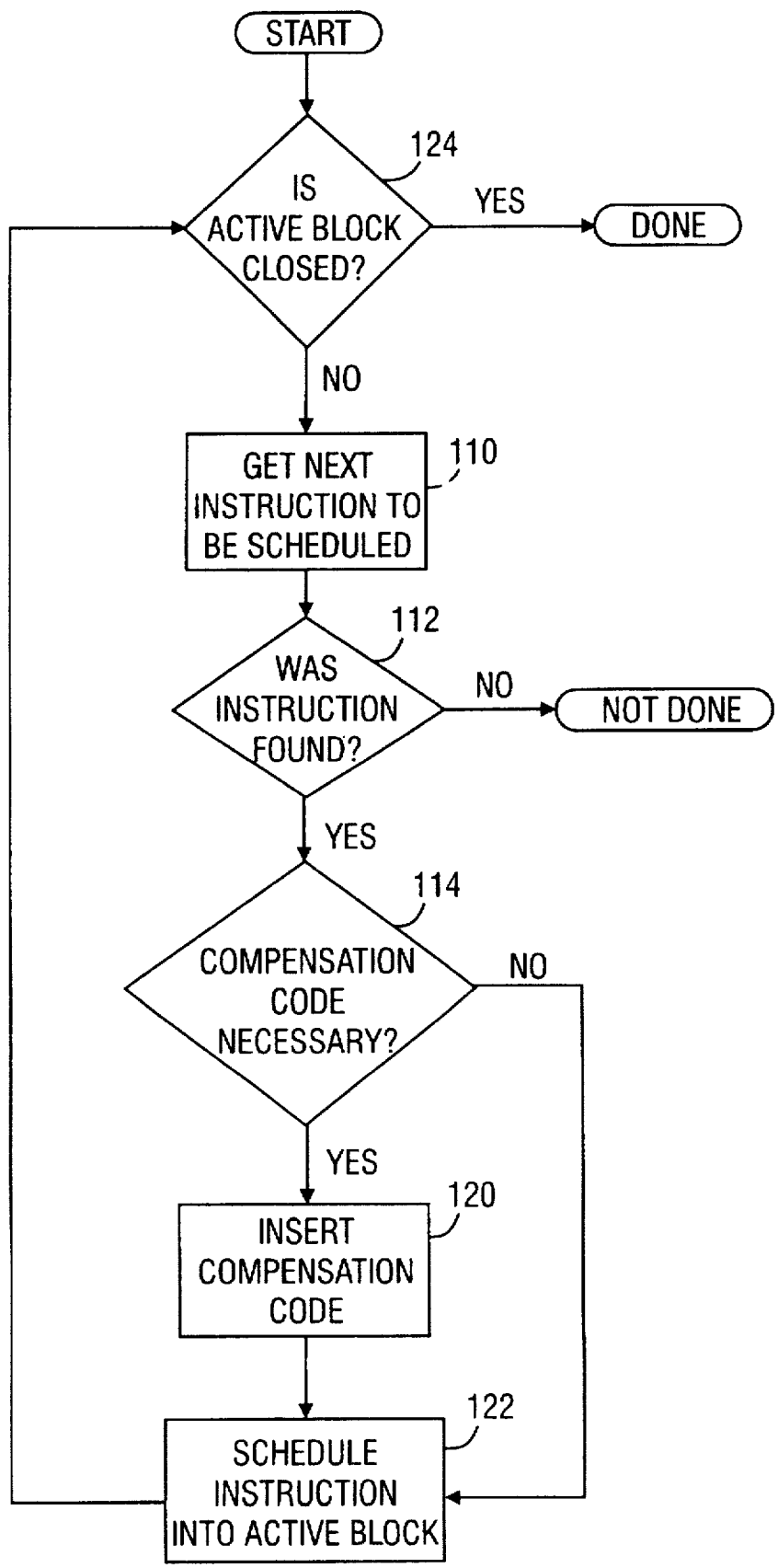
FIG. 9 shows a block diagram illustrating the operational flow of the instruction scheduling procedure of the exemplary scheduler of FIG. 5.

Returning now to FIG. 7, once the wavefront is initialized and an active block is chosen on the wavefront, instructions may be scheduled into the active block, step 82. The details of scheduling instructions into the active block are illustrated in FIG. 9. Initially, the scheduler must determine whether the active block is closed, step 124. If so, scheduling into that block is done. If not, scheduling proceeds. The scheduler will first obtain the next instruction to be scheduled, step 110.

Figure 10:
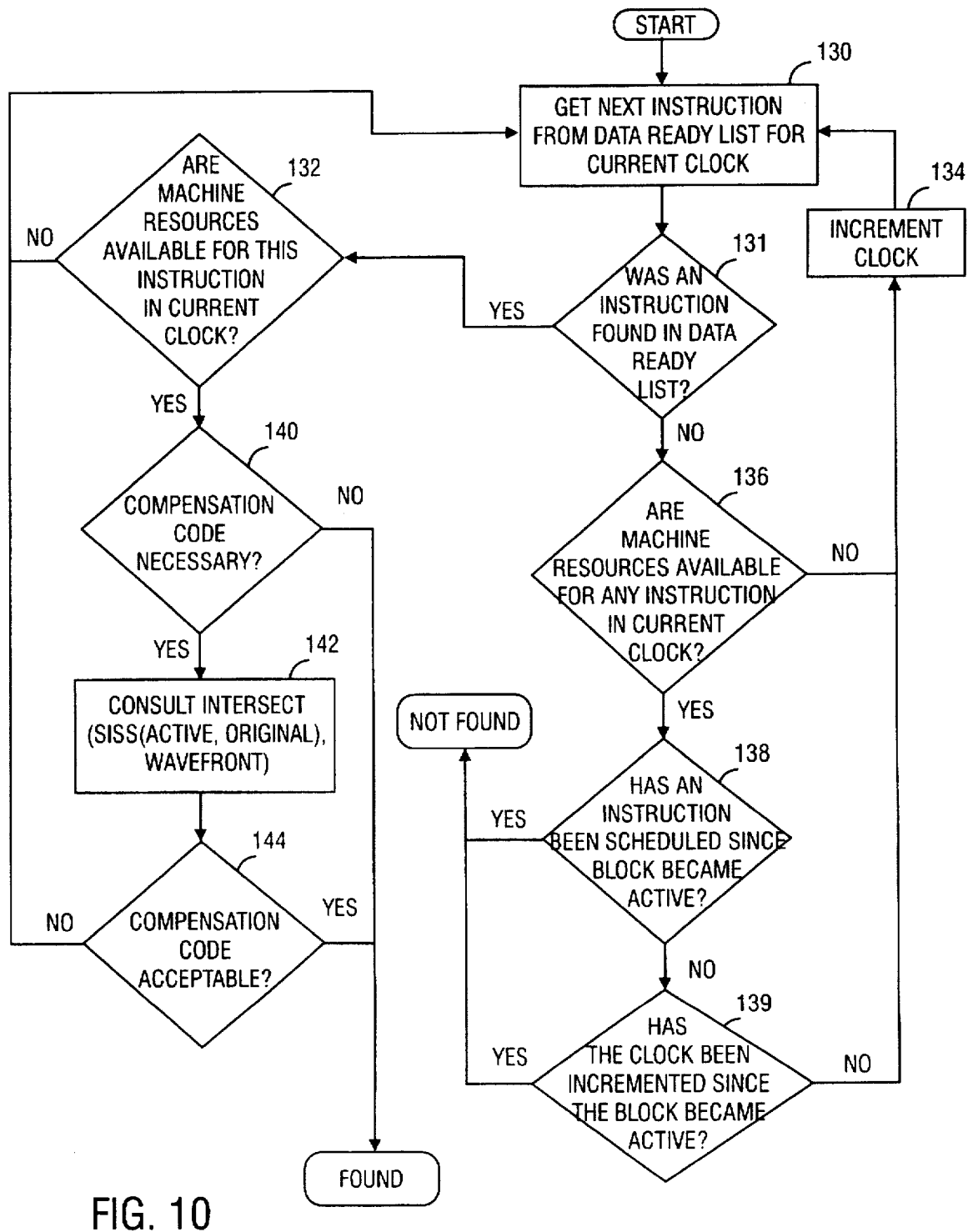
FIG. 10 shows a block diagram illustrating the operational flow of the procedure for obtaining an instruction to be scheduled in the exemplary scheduler of FIG. 5.

The steps in obtaining the next instruction to be scheduled are illustrated in FIG. 10. Initially, the scheduler attempts to retrieve an instruction in the current clock from the data ready list, step 130. If an instruction is found, step 131, the scheduler determines if machine resources are available in the active block to schedule the instruction in the current clock, step 132. If no resources are available, the scheduler retrieves another instruction from the data ready list, step 130. If resources are available, step 132, the scheduler then checks to determine if the insertion of compensation code will be necessary, step 140. If not, a suitable candidate instruction has been found. If compensation code is necessary, step 140, then before it schedules the instruction, the scheduler determines whether the compensation code is acceptable, by consulting some subset of the blocks into which compensation copies will be inserted to determine what effects the compensation code will have on those blocks. In this embodiment, the scheduler consults the blocks on the wavefront that are also in SISS(active, original), step 142. As discussed above, SISS(active, original) is the set of blocks consisting of the bottom-most blocks in the control flow diagram at which compensation copies may be scheduled, while maintaining the SCP property, when moving an instruction from its original location into the active block. Thus, when a block in SISS(active, original) is also on the wavefront, the scheduler must schedule any necessary compensation copies into the block at that time or otherwise decide not to schedule the instruction as proposed (because once the wavefront advances past a block, no more instructions are scheduled into that block). Different methods of consulting exist: for example, rather than consulting only blocks in SISS(active, original) that are also in the wavefront, the scheduler could consult all blocks on the wavefront that reach the original block, or consult all the blocks in SISS(active, original).

By making this consultation, the scheduler is able to determine whether a proposed compensation copy is acceptable when deciding whether to schedule the candidate instruction into the active block, by taking into account the harmful effects of compensation code. The blocks being consulted can look at several factors to determine whether the insertion of compensation code will produce harmful effects. Which factors are useful will depend on which consulting method is applied by the scheduler. If blocks not on the wavefront are consulted, then the instructions have not been scheduled in that block yet, so it is impossible to know exactly how the insertion of compensation code will affect the block. If only blocks on the wavefront are consulted, then the consultation will give a better idea of the effects of compensation code. If insertion of the compensation code would increase the critical path in the block, for example, the block might deem it harmful. Also, if the compensation code would increase the number of cycles needed to execute the instructions in the block due to insufficient machine resources, the compensation code might be harmful. Dummy blocks, which are designed to remain empty at all times, are very reluctant to accept compensation code.

After the appropriate blocks are consulted, the scheduler determines whether the compensation code is acceptable, step 144. In this embodiment, the compensation blocks themselves decide whether the compensation code is "acceptable" or "not acceptable," based on the presence of any harmful effects such as those discussed above. However, the presence of harmful effects need not end the inquiry. In another embodiment, the compensation blocks might return a measure of the desirability of the compensation code, so that the scheduler itself may decide whether or not a compensation copy is acceptable by weighing the desirability of the compensation code against the priority of the candidate instruction. In other embodiments, the scheduler might find the compensation copies to be acceptable despite the harmful effects, by looking at the priority of the instruction to be scheduled and the execution frequency of the active block versus the blocks being consulted. Whatever method of determining acceptability is used, if the compensation code was not acceptable, step 144, the scheduler will look for another suitable candidate instruction in the data ready list, step 130. However, if the compensation code is acceptable, a suitable candidate instruction has been found.

If, at step 131, there are no instructions in the data ready list for the current clock, the scheduler will either increment the clock, step 134, and try again, or simply determine that no suitable candidate instruction exists. The scheduler increments the clock if no machine resources are available in the active block to execute any instruction in the data ready list for the current clock, step 136, or if machine resources are available but no instruction has been scheduled since the block became active, step 138, and the clock has not been incremented, step 139. The latter prevents the scheduler from becoming caught in an infinite loop by ensuring that, once a block becomes active, at least one instruction is scheduled into it or the clock is incremented before another block becomes active. If resources are available, and at least one instruction has been scheduled since the block became active or the clock was incremented, no danger of an infinite loop exists and the scheduler determines simply that no suitable candidate instruction has been found.

Returning to FIG. 9, if no suitable instruction was found, step 112, then the attempt to schedule instructions into the active block returns not done. If a suitable candidate was found, the scheduler determines if compensation code will be necessary, step 114. If no compensation code is necessary, then the candidate instruction is scheduled into the active block, step 122. If compensation code was found necessary, the scheduler will insert the compensation code, step 120. Insertion of compensation code involves making a copy of the moved instruction and moving it into the blocks that were consulted. As for other blocks in SISS(active, original) that were not consulted because they were not on the wavefront, the scheduler will keep track of the fact that compensation copies needs to be placed into those blocks no later than when the wavefront passes through those blocks. The scheduler will then schedule the instruction into the active block, step 122.

After an instruction has been scheduled into the active block, step 122, the scheduler determines whether the active block is closed, step 124. A block is open if unscheduled instructions remain, either from this block or from above the wavefront, and these instructions ought to be scheduled in this block (either because they cannot be moved below this block or because it has been decided not to move them below this block). A block is closed if all instructions that cannot or will not be moved below the block have been scheduled. Dummy blocks are always closed. Closed blocks (that are not dummy blocks) do accept compensation copies. If compensation code is moved into a closed block, the block is marked open again before the code is inserted. If the active block is not closed, scheduling of instructions into that block proceeds, step 110. If the active block is closed, the instruction scheduling operation returns done.

Returning to FIG. 7, an attempt has been made to schedule instructions into the active block, step 82. If there are no more unscheduled instructions in the region, step 84, scheduling in the region is complete. If unscheduled instructions remain, the scheduler determines if scheduling into the active block is done, step 85. The scheduling is not done (as determined in FIG. 9) if there remain unscheduled instructions that must be scheduled into this block and no suitable candidate instruction could be found because, for example, the compensation code was found unacceptable. If such is the case, the scheduler will update the active block, i.e., choose another open block on the wavefront to be active, step 88, and then repeat the attempt to schedule instructions into the active block, step 82. The scheduling in the active block is done, however, if the active block is closed. In that case, the scheduler marks the active block closed, step 86, and then attempts to update the wavefront, step 87. In other embodiments, the scheduler may update the active block at different intervals, such as after every instruction is scheduled, or only after the current active block becomes closed.

The steps in updating the wavefront are illustrated in FIG. 11. Only closed blocks may be removed from the wavefront. As explained above, the wavefront is a SICS, and assuming that all JS edges have been removed as described above, the SICS property can be maintained if the wavefront is modified according to three rules: (1) a block may be added to the wavefront only if all its predecessors presently lie on the wavefront; (2) if any block is added to wavefront, all its predecessors must be removed from the wavefront; and (3) if any block is removed from the wavefront W, all its successors must be added to the wavefront. These rules ensure that the wavefront remains a SICS. The first step in updating the wavefront is choosing the set of blocks to be removed, step 150.

Many alternatives exist for choosing which blocks to remove from the wavefront. Two alternatives are demonstrated in FIG. 12. Under the first alternative, an attempt is made to remove all closed wavefront blocks, step 162. Under the second alternative, step 164, an attempt is made to remove all closed wavefront blocks that do not have as a successor a dummy block with a successor that is reachable from an open wavefront block. The latter alternative is a more sophisticated method that reduces the amount of time that a dummy block will spend on the wavefront, where it could impede code motion.

Whichever alternative is used, the set of blocks to be removed must comply with the three rules listed above. Thus, at step 166, any block with a successor whose other predecessors are not also candidates for removal from the wavefront cannot itself be removed from the wavefront. At step 168, the previous step is performed repeatedly until no block is removed. Excluding such blocks from the set of blocks to be removed from the wavefront brings the set into compliance with the rules above.

Returning to FIG. 11, once the set of blocks to be removed from the wavefront has been selected, step 150, the scheduler removes those blocks from the wavefront, step 152, and adds the successors of those blocks to the wavefront, step 154.

Returning to FIG. 7, once the wavefront is updated, step 87, the scheduler chooses a new active block on the wavefront, step 88. Next, the process repeats, and the scheduler again attempts to schedule instructions into the active block, step 82.

Figure 14:
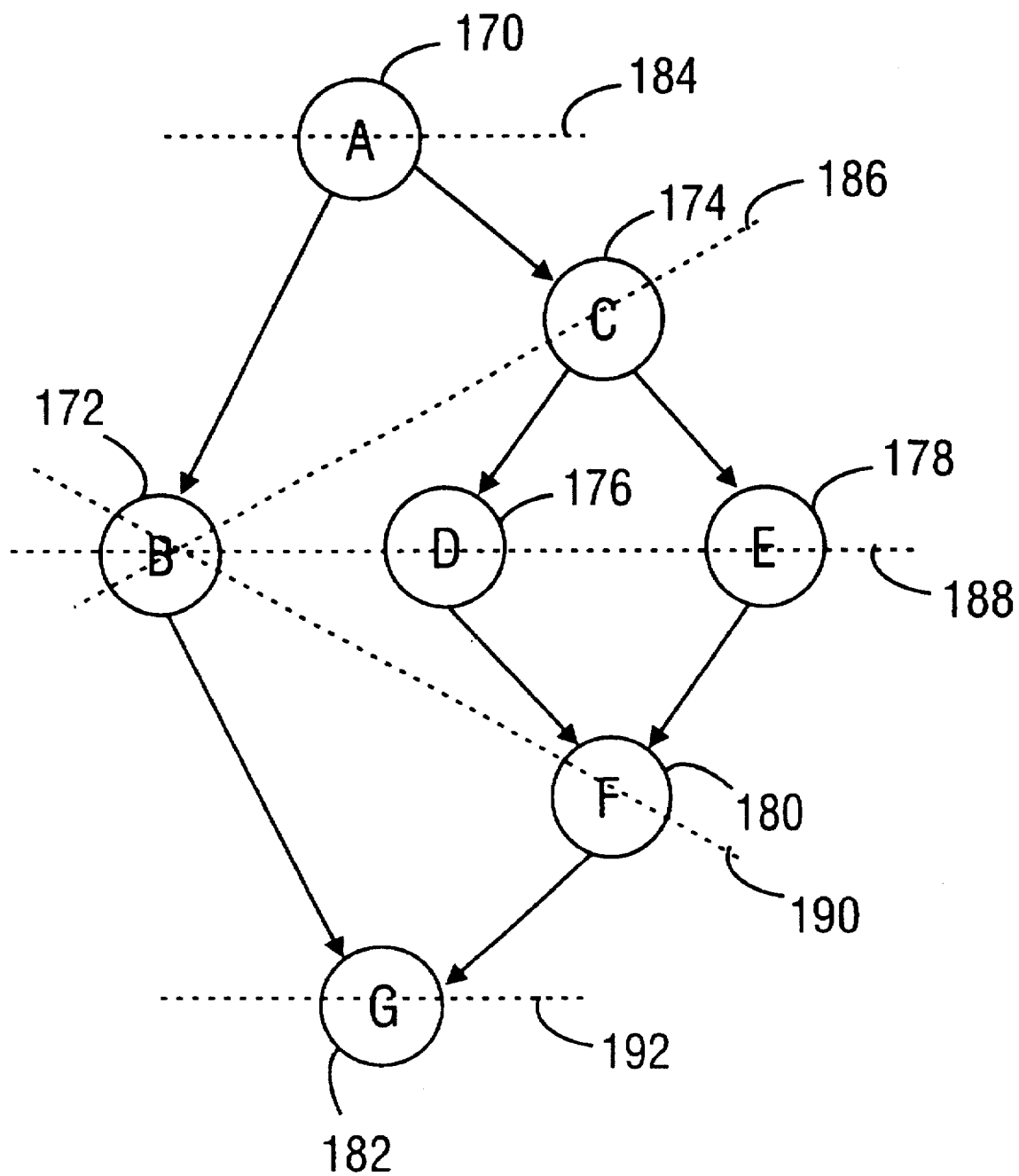
FIG. 14 illustrates wavefront advancement through a control flow graph.

FIG. 14 illustrates how the wavefront would advance through a typical control flow diagram, assuming alternative 1 of FIG. 12 is in effect. The control flow diagram for the hypothetical region consists of block A 170, block B 172, block C 174, block D 176, block E 178, block F 180, and block G 182. In accordance with the above described procedures, the wavefront is initialized to be the set of blocks with no predecessors in the region. In this diagram, therefore, the wavefront will initially consist only of block A 170. The initial wavefront is shown at position 184.

Once block A 170 is closed, the wavefront is updated. Initially the set of blocks to be removed from the wavefront is defined as the set of all closed wavefront blocks, or block A 170. Any block in this set with a successor whose other predecessors are not also being removed cannot be removed from the wavefront. This does not apply to any successor of block A 170, so block A 170 is removed from the wavefront, and its successors, block B 172 and block C 174, are added to the wavefront. The new wavefront is shown at position 186.

Suppose both block B 172 and block C 174 are closed, and the wavefront is again updated. Again, the set of blocks to be removed from the wavefront is the set of all closed wavefront blocks, or block B 172 and block C 174. However, any block with a successor whose other predecessors are not also being removed cannot be taken out of the wavefront. Block B 172 has a successor, block G 182, with a predecessor, block F 180, that is not also being removed from the wavefront. Therefore, block B 172 cannot be removed from the wavefront either. This leaves only block C 174 to be removed from the wavefront. Once this is done, the successors of block C 174 are added to the wavefront, namely block D 176 and block E 178. The wavefront is shown at its new position 188. In similar fashion, the wavefront advances to position 190 and finally to position 192.

The type of scheduling described above has broad application in a number of different settings. It applies equally to upward and downward code motion in a control flow graph. Similarly, it applies to both speculative and non-speculative code motion. Finally, in another embodiment, it could apply to bottom-up scheduling, rather than top-down scheduling as is presented here. In that case, the wavefront would be initialized to include all blocks having no successor in the region. By switching "predecessor" and "successor," "reachable" and "reaching," and "top" and "bottom" in all the rules regarding wavefront advancement and compensation code, the algorithm presented here applies with equal force in that instance as well.

Any of the foregoing methods may be implemented by programming a suitable general purpose computer. The programming may be accomplished through the use of a program storage device readable by the general purpose computer and encoding a program of statements executable by the computer for performing the methods described above. The program storage device may take the form of, e.g., one or more floppy disks, a hard disk, a CD ROM or other optical or magnetic-optical disk, a magnetic tape, a read-only memory chip (ROM), and other forms of the kind well-known in the art or subsequently developed. The program of statements may be object code, or a high-level language, or in some intermediate form such as partially compiled code. The precise forms of the program storage device and of the encoding of statements are immaterial.

What is claimed is:

1. A method of scheduling an instruction of a computer program into a region of the computer program, comprising:

identifying a plurality of basic blocks of the computer program, wherein a plurality of edges interconnect the basic blocks to form a control flow path;

removing all edges from a split block to a join block within the region by the insertion of empty compensation blocks;

determining whether the compensation blocks impede the control flow path, and if they do, the compensation blocks being deemed dummy blocks;

identifying at least one of the basic blocks as a wavefront, wherein any control flow path from an entry point of the region to an exit point of the region passes through the wavefront and the wavefront is strongly independent;

identifying a basic block on the wavefront as an active block;

consulting the basic blocks on the wavefront to determine whether the insertion of compensation code into the basic blocks will produce a harmful effect on the control flow path, and if it will, the compensation code being deemed unacceptable;

scheduling the instruction into the active block if the compensation code is acceptable;

updating the wavefront when the active block closes; and repeating the scheduling step until all the instructions in the region have been scheduled.

2. The method of claim 1, wherein the necessary compensation code is acceptable if none of the bottom-most basic blocks in the control flow path and the wavefront is a dummy block.

3. The method of claim 1, wherein the compensation code is acceptable if insertion of the compensation code into one of the bottom-most basic blocks in the control flow path and the wavefront does not increase a critical path for one of the basic blocks.

4. The method as set forth in claim 1, wherein the compensation code is acceptable if insertion of the compensation into one of the bottom-most basic blocks in the control flow path and the wavefront does not use a resource that is scarce in one of the basic blocks.

5. The method as set forth in claim 1, further comprising:

removing the active block from the wavefront in response to the active block closing;

adding to the wavefront all successor basic blocks of the active block; and identifying a new active block.

6. A program storage device readable by a general purpose computer, the program storage device encoding statements for performing a method of scheduling an instruction of a computer program, the method comprising scheduling the instruction into a region of the computer program by:

identifying a plurality of basic blocks of the computer program, wherein a plurality of edges interconnect the basic blocks to form a control flow path;

removing all edges from a split block to a join block within the region by the insertion of empty compensation blocks;

determining whether the compensation blocks impede the control flow path, and if they do, the compensation blocks being deemed dummy blocks;

identifying at least one of the basic blocks as a wavefront, wherein any control flow path from an entry point of the region to an exit point of the region passes through the wavefront and the wavefront is strongly independent;

identifying a basic block on the wavefront as an active block;

consulting the basic blocks on the wavefront to determine whether the insertion of compensation code into the basic blocks will produce a harmful effect on the control flow path, and if it will, the compensation code being deemed unacceptable;

scheduling the instruction into the active block if the compensation code is acceptable;

updating the wavefront when the active block closes; and repeating the scheduling step until all the instructions in the region have been scheduled.

7. The program storage device as set forth in claim 6, wherein the compensation code is acceptable if none of the bottom-most basic blocks in the control flow path and the wavefront is a dummy block.

8. The program storage device as set forth in claim 6, wherein the compensation code is acceptable if insertion of the compensation code into one of the bottom-most basic blocks in the control flow path and the wavefront does not increase a critical path for one of the basic blocks.

9. The program storage device as set forth in claim 6, wherein the compensation code is acceptable if insertion of the compensation into one of the bottom-most basic blocks in the control flow path and the wavefront does not use a resource that is scarce in one of the basic blocks.

10. The program storage device as set forth in claim 6, the method further comprising:

removing the active block from the wavefront in response to the active block closing;

adding to the wavefront all successor basic blocks of the active block; and identifying a new active block.

11. A computer programmed with a first program, the first program including statements for a method, the method comprising scheduling an instruction of a second program into a region of the second program by:

identifying a plurality of basic blocks of the computer program, wherein a plurality of edges interconnect the basic blocks to form a control flow path;

removing all edges from a split block to a join block within the region by the insertion of empty compensation blocks;

determining whether the compensation blocks impede the control flow path, and if they do, the compensation blocks being deemed dummy blocks;

identifying at least one of the basic blocks as a wavefront, wherein any control flow path from an entry point of the region to an exit point of the region passes through the wavefront and the wavefront is strongly independent;

identifying a basic block on the wavefront as an active block;

consulting the basic blocks on the wavefront to determine whether the insertion of compensation code into the basic blocks will produce a harmful effect on the control flow path, and if it will, the compensation code being deemed unacceptable;

scheduling the instruction into the active block if the compensation code is acceptable;

updating the wavefront when the active block closes; and repeating the scheduling step until all the instructions in the region have been scheduled.

12. The computer as set forth in claim 11, wherein the compensation code is acceptable if none of the bottom-most basic blocks in the control flow path and the wavefront is a dummy block.

13. The computer as set forth in claim 11, wherein the compensation code is acceptable if insertion of the compensation code into one of the bottom-most basic blocks in the control flow path and the wavefront does not increase a critical path for one of the basic blocks.

14. The computer as set forth in claim 11, wherein the compensation code is acceptable if insertion of the compensation into one of the bottom-most basic blocks in the control flow path and the wavefront does not use a resource that is scarce in one of the basic blocks.

15. The computer as set forth in claim 11, wherein the method further comprises:

removing the active block from the wavefront in response to the active block closing;

adding to the wavefront all successor basic blocks of the active block; and identifying a new active block.

* * * * *